UNITED STATES PATENT OFFICE.

HENRY SPENCER BLACKMORE, OF MOUNT VERNON, NEW YORK.

PROCESS OF MAKING SULFIDS.

SPECIFICATION forming part of Letters Patent No. 605,458, dated June 7, 1898.

Application filed July 22, 1896. Renewed April 21, 1898. Serial No. 678,433. (No specimens.)

*To all whom it may concern:*

Be it known that I, HENRY SPENCER BLACKMORE, a citizen of the United States, and a resident of the city of Mount Vernon, in the county of Westchester and State of New York, have invented a new and useful Improvement in Processes of Producing Aluminium and other Sulfids, of which the following is a specification.

The object of my invention is to produce aluminium sulfid together with sulfids of alkali or other metals; and it consists, essentially, in exposing the aluminates of such alkali or other metals while in a molten state to the action of carbon-bisulfid vapor or gas.

In carrying out my invention on a practical basis I take an aluminate of alkali or other metal and heat the same in a proper receptacle until it assumes a molten condition, then gradually pass the vapor of a compound of sulfur and carbon, such as carbon bisulfid, through the same, whereby it is decomposed by the combined action of sulfur and carbon in vaporous or gaseous form, the oxygen of aluminate combining with the carbon of the carbon bisulfid, producing carbon dioxid and carbon oxysulfid, (carbonyl sulfid,) while the sulfur combines with other elements of aluminate, producing compound sulfids with the same. The reaction which takes place may be illustrated by the following chemical formula or equation:

$$Na_2Al_2O_4 + 4CS_2 = Na_2S - Al_2S_3 + 3CO_2 + COS.$$

If, however, the carbon bisulfid is not in excess, the production of carbon oxysulfid (carbonyl sulfid) may be avoided and carbonic anhydrid only eliminated as follows:

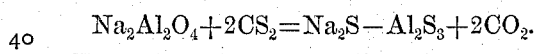

$$Na_2Al_2O_4 + 2CS_2 = Na_2S - Al_2S_3 + 2CO_2.$$

For practical purposes I prefer to employ sodium aluminate, in which case a double sulfid of aluminium and sodium is produced.

In order to produce the sodium aluminate, I melt sodium hydroxid (hydrated oxid) and introduce into it aluminium oxid until it is saturated with the same. The aluminium oxid thus combines with the alkali, producing an aluminate. The reaction which takes place may be thus chemically illustrated:

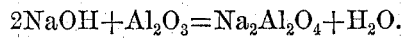

$$2NaOH + Al_2O_3 = Na_2Al_2O_4 + H_2O.$$

Potassium or other aluminate for transforming into sulfid may be produced in like manner.

It can be readily seen that the aluminium oxid assumes an acid condition, combining with the alkali or other elements of more electropositive nature, as acid radical.

I find it also of great advantage in converting aluminate into sulfid for the separation of aluminium by electrolysis or other means to employ a mixture of sodium and potassium aluminate, as this mixture melts or assumes a molten condition at a lower temperature than either of the alkali aluminates *per se.*

Having now described my invention, what I claim as new, and desire to secure by Letters Patent, is—

1. The process for producing aluminium and other sulfids which consists in exposing a molten aluminate to the action of carbon-bisulfid vapor or gas substantially as described.

2. The process for producing aluminium and other sulfids which consists in melting or fusing a metallic aluminate and passing through the same a compound of carbon and sulfur in vaporized or gaseous state substantially as described.

3. The process for producing aluminium and other sulfids which consists in exposing a molten aluminate to the combined action of sulfur and carbon in a volatilized or gaseous state substantially as described.

4. The process for producing aluminium and alkali sulfids which consists in exposing a molten mixture of sodium and potassium aluminate to the action of carbon bisulfid substantially as described.

5. The process for producing aluminium and other sulfids which consists in transforming compounds of aluminium oxid with more electropositive element, the said aluminium oxid existing as electronegative or acid in the compound, by passing through said compound in a molten state a current of carbon-bisulfid vapor or gas substantially as described.

6. The process for producing aluminium and other sulfids which consists in passing vapor of carbon bisulfid through a fluid mass of an oxy compound of aluminium with an element or elements of more electropositive nature, such as sodium aluminate, substantially as described.

7. The process for producing aluminium and other sulfids which consists in fusing a compound produced by combining aluminium oxid with an oxid of an element or elements of more electropositive nature and exposing the same in a fused condition to the action of carbon-bisulfid vapor or gas substantially as described.

8. The process for producing aluminium and other sulfids which consists in exposing a compound of aluminium oxid with an oxid or oxids of metal or metals of more electropositive nature, to the action of carbon bisulfid substantially as described.

In testimony that I claim the foregoing as my invention I have signed my name, in presence of two witnesses, this 8th day of July, 1896.

HENRY SPENCER BLACKMORE. [L. S.]

Witnesses:
ISAAC BLACKMORE,
CHARLES F. IRWIN.